(12) United States Patent
Nakagawa et al.

(10) Patent No.: US 10,279,843 B2
(45) Date of Patent: May 7, 2019

(54) VEHICLE-BODY STRUCTURE FOR VEHICLE

(71) Applicant: MAZDA MOTOR CORPORATION, Hiroshima (JP)

(72) Inventors: Kohya Nakagawa, Aki-gun (JP); Kuniaki Nagao, Aki-gun (JP); Kenichi Yamamoto, Hiroshima (JP); Motoyasu Asakawa, Hiroshima (JP); Katsuya Himuro, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 250 days.

(21) Appl. No.: 15/110,041

(22) PCT Filed: Jan. 30, 2015

(86) PCT No.: PCT/JP2015/052665
§ 371 (c)(1),
(2) Date: Jul. 6, 2016

(87) PCT Pub. No.: WO2015/119054
PCT Pub. Date: Aug. 13, 2015

(65) Prior Publication Data
US 2016/0325785 A1   Nov. 10, 2016

(30) Foreign Application Priority Data
Feb. 6, 2014   (JP) .................................. 2014-021316

(51) Int. Cl.
*B62D 25/02*   (2006.01)
*B62D 25/20*   (2006.01)
(Continued)

(52) U.S. Cl.
CPC ....... *B62D 25/025* (2013.01); *B62D 25/2036* (2013.01); *B62D 27/02* (2013.01); *F16F 1/3605* (2013.01); *F16F 15/08* (2013.01)

(58) Field of Classification Search
CPC ... B62D 25/025; B62D 25/2036; B62D 27/02
(Continued)

(56) References Cited

U.S. PATENT DOCUMENTS

2002/0174954 A1   11/2002   Busseuil et al.
2013/0049391 A1   2/2013   Kurogi et al.
(Continued)

FOREIGN PATENT DOCUMENTS

CN   102963432 A   3/2013
CN   102963437 A   3/2013
(Continued)

OTHER PUBLICATIONS

International Search Report issued in PCT/JP2015/052665; dated Apr. 21, 2015.
(Continued)

*Primary Examiner* — Joseph D. Pape
(74) *Attorney, Agent, or Firm* — Studebaker & Brackett PC

(57) ABSTRACT

A reinforcing body is disposed in a closed cross sectional portion constituted by one or more vehicle body components. The reinforcing body is provided with a joining portion to be joined to the vehicle body components. The joining portion includes hard connecting portions connected to the vehicle body components in an abutting state, and a soft connecting portion connected to the vehicle body components via a vibration damping member. The storage shear rigidity (KB') of the vibration damping member is set in the range: 800 N/mm<KB'<57500 N/mm.

8 Claims, 7 Drawing Sheets

(51) Int. Cl.
  *B62D 27/02*   (2006.01)
  *F16F 1/36*    (2006.01)
  *F16F 15/08*   (2006.01)
(58) Field of Classification Search
  USPC ......................................................... 296/204
  See application file for complete search history.

(56) References Cited

U.S. PATENT DOCUMENTS

| | | |
|---|---|---|
| 2013/0049392 A1 | 2/2013 | Kurogi et al. |
| 2013/0049405 A1 | 2/2013 | Kurogi et al. |
| 2013/0049408 A1 | 2/2013 | Kurogi et al. |

FOREIGN PATENT DOCUMENTS

| | | |
|---|---|---|
| CN | 103225663 A | 7/2013 |
| JP | H11-270623 A | 10/1999 |
| JP | 2000-085634 A | 3/2000 |
| JP | 2010-083355 A | 4/2010 |
| JP | 2013-049375 A | 3/2013 |
| JP | 2013-049376 | 3/2013 |
| JP | 2013-177959 A | 9/2013 |

OTHER PUBLICATIONS

An Office Action issued by the Chinese Patent Office dated Apr. 26, 2017, which corresponds to Chinese Patent Application No. 201580007069.X; with partial English language translation.

VEHICLE-BODY STRUCTURE FOR VEHICLE

TECHNICAL FIELD

The present invention relates to a vehicle body structure for a vehicle, which includes one or more vehicle body components constituting a closed cross sectional portion.

BACKGROUND ART

In vehicles such as automobiles, there is a demand for increasing the rigidity of a vehicle body in order to improve riding comfort and safety. For instance, Patent Literature 1 proposes disposing a reinforcing body in a closed cross sectional portion constituted by vehicle body components. However, it may be difficult to sufficiently suppress transmission of vibrations generated in each part of a vehicle to a vehicle compartment during traveling, and to sufficiently improve riding comfort depending on e.g. a position where a reinforcing body is disposed when a reinforcing body is simply provided to increase the rigidity of a vehicle body.

Regarding the aforementioned problem, the inventors invented a structure, as disclosed in Patent Literature 2, in which a reinforcing body is disposed in a closed cross sectional portion constituted by vehicle body components, and a joining portion of the reinforcing body to be joined to the vehicle body components is constituted by a hard connecting portion to be connected to the vehicle body components in an abutting state, and a soft connecting portion to be connected to the vehicle body components via a vibration damping member. According to the aforementioned configuration, it is possible to increase the rigidity of a vehicle body, and to absorb vibrations of the vehicle body by the vibration damping member for suppressing transmission of vibrations to a vehicle compartment and for improving riding comfort.

CITATION LIST

Patent Literature

Patent Literature 1: Japanese Unexamined Patent Publication No. 2000-085634
Patent Literature 2: Japanese Unexamined Patent Publication No. 2013-49376

SUMMARY OF INVENTION

Technical Problem

The inventors further studied the structure disclosed in Patent Literature 2, specifically, a structure, in which a joining portion between the reinforcing body and vehicle body components is constituted by a hard connecting portion connected to the reinforcing body and to the vehicle body components in an abutting state, and a soft connecting portion connected to the reinforcing body and to the vehicle body components via a vibration damping member. As a result of a further study, the inventors found that, although it is possible to damp vibrations of a vehicle body by the aforementioned structure, the vibration damping effect may vary depending on the shape of the vibration damping member or a like factor, and it may be difficult to effectively damp vibrations depending on the shape of the vibration damping member or a like factor.

In view of the above, an object of the present invention is to provide a vehicle body structure for a vehicle, which enables to securely and effectively damp vibrations of a vehicle body.

Solution to Problem

In order to solve the aforementioned problem, the present invention provides a vehicle body structure for a vehicle, which includes one or more vehicle body components constituting a closed cross sectional portion. The vehicle body structure is provided with a reinforcing body disposed in the closed cross sectional portion. The reinforcing body includes a joining portion to be joined to the vehicle body component. The joining portion includes a hard connecting portion connected to the vehicle body component in an abutting state, and a soft connecting portion connected to the vehicle body component via a vibration damping member. The vibration damping member is formed in such a manner that a storage shear rigidity KB' thereof satisfies a requirement: 800 N/mm<KB'<57500 N/mm.

According to the present invention, it is possible to securely and effectively damp vibrations of a vehicle body.

DESCRIPTION OF EMBODIMENTS

In the following, an embodiment of the present invention is described based on the drawings.

Figure 1:
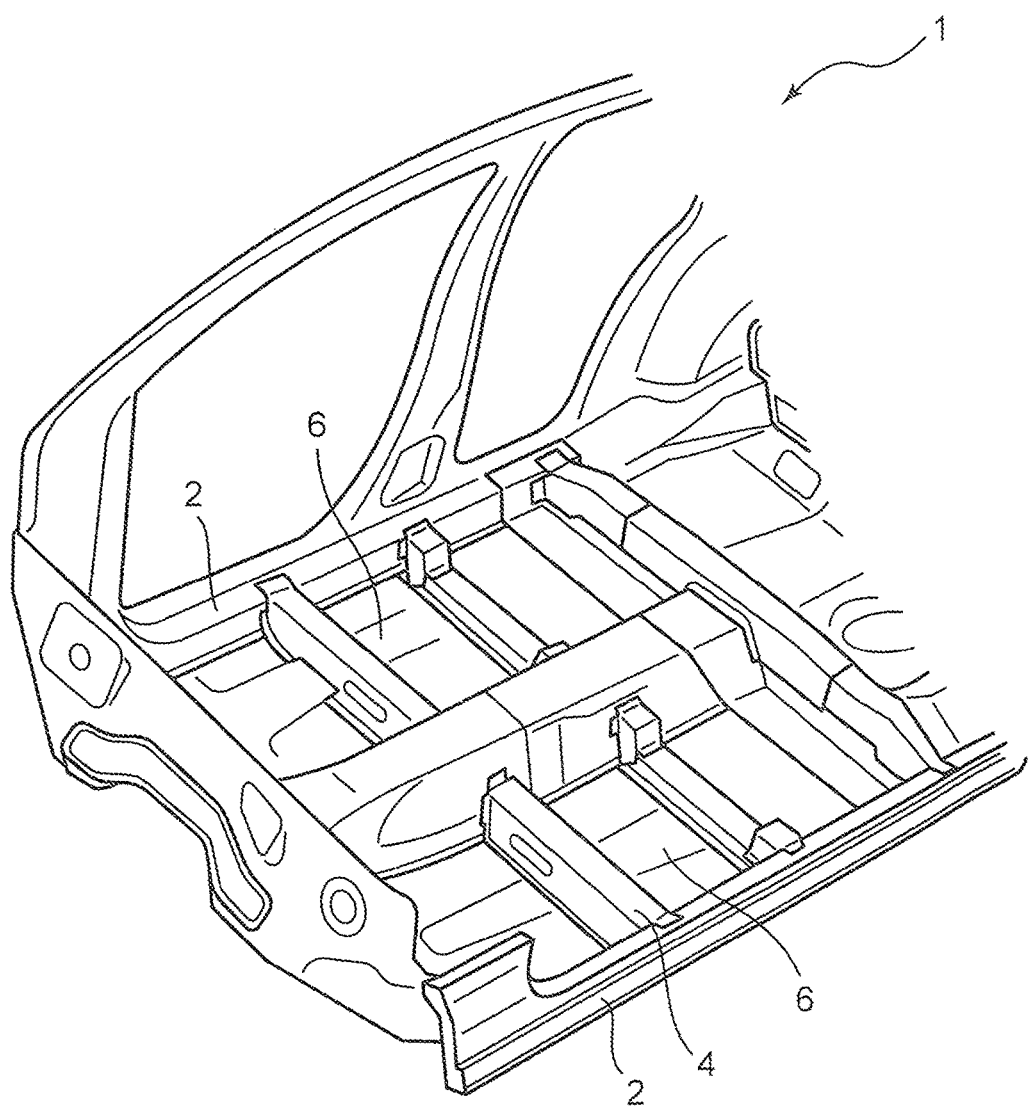
FIG. 1 is a diagram illustrating an example of a frame structure of a front portion of a vehicle compartment of a vehicle to which a vehicle body structure for a vehicle of the present invention is applied.
Figure 2:
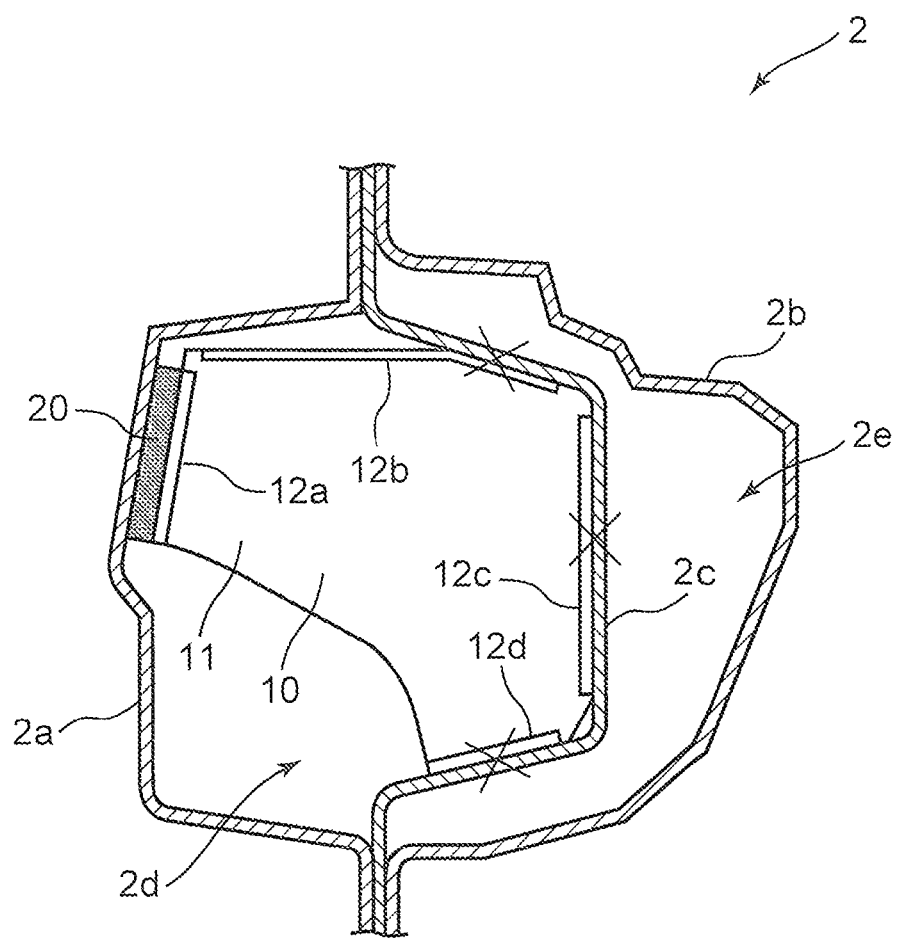
FIG. 2 is a diagram illustrating a structure of a side sill member in which a bulk head is disposed.

FIG. 1 is a diagram illustrating an example of a frame structure of a front portion of a vehicle compartment of a vehicle to which a vehicle body structure for a vehicle of the present invention is applied. As illustrated in FIG. 1, a plurality of frames such as side sill members 2, No. 2-cross frames (cross members) 4, and floor frames 6 are disposed in a vehicle 1. Many of these frames have a structure such that a closed cross sectional portion constituted by one or more vehicle body components is formed therein. For instance, as illustrated in FIG. 2, the side sill member 2 is constituted by a side sill inner member (a vehicle body component) 2a that constitutes an inner portion of a vehicle body, a side sill outer member (a vehicle body component) 2b that constitutes an outer portion of the vehicle body, and a side sill reinforcement member (a vehicle body component) 2c that is disposed between the side sill inner member 2a and the side sill outer member 2b. Closed cross sectional portions 2d and 2e are formed inside the side sill member 2 by the side sill inner member 2a, the side sill outer member 2b, and the side sill reinforcement member 2c.

As disclosed in Japanese Unexamined Patent Publication No. 2013-49376, the inventors invented, the following structure, as a structure capable of suppressing transmission of vibrations of a vehicle body to a vehicle compartment by absorbing vibrations of the vehicle body while increasing the rigidity of the vehicle body. In the structure, a bulk head (a reinforcing body) is disposed in a closed cross sectional portion constituted by vehicle body components, and a joining portion of the bulk head to be joined to the vehicle body components is constituted by a hard connecting portion to be connected to the vehicle body components in an abutting state, and a soft connecting portion to be connected to the vehicle body components via a vibration damping member.

Figure 3:
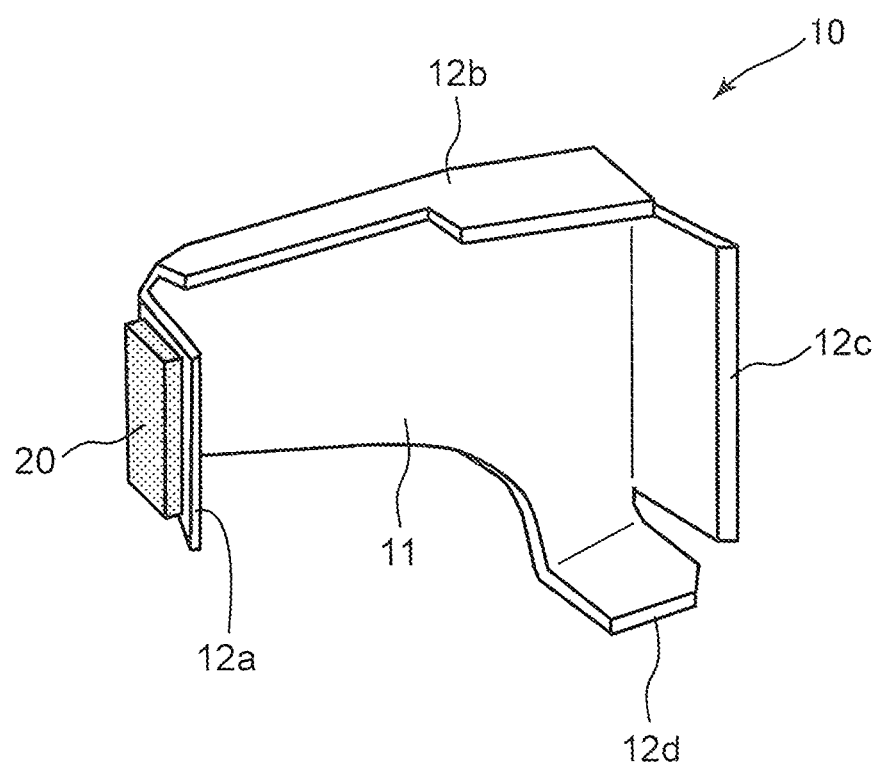
FIG. 3 is a schematic diagram of the bulk head illustrated in FIG. 2.

For instance, in the example illustrated in FIG. 2, a bulk head (a reinforcing body) 10 is disposed in the substantially rectangular closed cross sectional portion 2d constituted by the side sill inner member 2a and the side sill reinforcement member 2c. A part of a portion (a joining portion) of the bulk head 10 to be joined to the inner surface of the side sill inner member 2a and to the inner surface of the side sill reinforcement member 2c is connected to the inner surfaces by welding. Further, the other part of the joining portion is connected to the inner surfaces via a vibration damping member. FIG. 3 is a schematic configuration diagram of the bulk head 10. As illustrated in FIG. 3 and FIG. 2, the bulk head 10 is constituted by a substantially pentagonal partition portion 11 extending in the cross sectional direction of the closed cross sectional portion 2d in such a manner as to cover at least a part of the closed cross sectional portion 2d, and by four flange portions 12 (12a to 12d), which respectively project in a direction substantially orthogonal to the partition portion 11 from four sides of the partition portion 11, and each of which includes a surface facing the inner surfaces of the side sill inner member 2a and of the side sill reinforcement member 2c. Further, the flange portion 12a as one of the flange portions 12, and the inner surface (in the example illustrated in FIG. 2, the inner surface of the side sill inner member 2a) are connected to each other by the vibration damping member 20 via the vibration damping member 20. On the other hand, the flange portions 12b to 12d as the remaining flange portions, and the inner surface are connected to each other in an abutting state by spot-welding. In FIG. 2, portions indicated by the symbol X are spot-welded portions.

According to the aforementioned configuration, a bulk head and vehicle body components (such as a side sill inner member and a side sill reinforcement member) are firmly connected to each other by hard connecting portions (spot-welded portions). This makes it possible to increase the rigidity of a vehicle body as a whole, and to damp vibrations of the vehicle body components by a vibration damping member at a soft connecting portion. This is advantageous in suppressing transmission of vibrations to a passenger or passengers in a vehicle compartment.

Meanwhile, as a result of a further study on the aforementioned structure, the inventors found that it may be difficult to effectively obtain a vibration damping effect in the aforementioned structure depending on the shape of a vibration damping member or a like factor. More specifically, the inventors found the following. A loss factor of a vibration damping member varies depending on a storage elastic modulus thereof. Therefore, it is known to some extent that a vibration damping effect varies according to a storage elastic modulus of the vibration damping member. However, the vibration damping effect varies when the shape of a vibration damping member changes, regardless that the physical properties of the vibration damping member remain unchanged.

Note that a loss factor is an index indicating dynamic characteristics of a viscoelastic material (a material having a viscosity, which is a property such that a force is generated with respect to a rate of deformation, and an elasticity, which is a property such that a force is generated with respect to a magnitude of deformation), and is a value expressed by (loss elastic modulus)/(storage elastic modulus). Further, a storage elastic modulus is derived from an elastic property of a viscoelastic material, and is a value expressed by (stress at maximum strain)/(maximum strain) in a stress-strain diagram when sinusoidal deformation is applied to the viscoelastic material. On the other hand, a loss elastic modulus is derived from a viscous property of a viscoelastic material, and is a value expressed by (stress at zero strain)/(maximum strain) in a stress-strain diagram when sinusoidal deformation is applied to the viscoelastic material.

Regarding this point, the inventors examined a relationship between a physical property i.e. a storage elastic modulus of a vibration damping member, a shape of the vibration damping member, and a vibration damping effect by changing the storage elastic modulus and the shape of the vibration damping member.

Specifically, the aforementioned structure was modeled. Then, vibration damping amounts of frames having different shapes in changing the physical property and the shape of a vibration damping member were examined by simulation.

Figure 4:
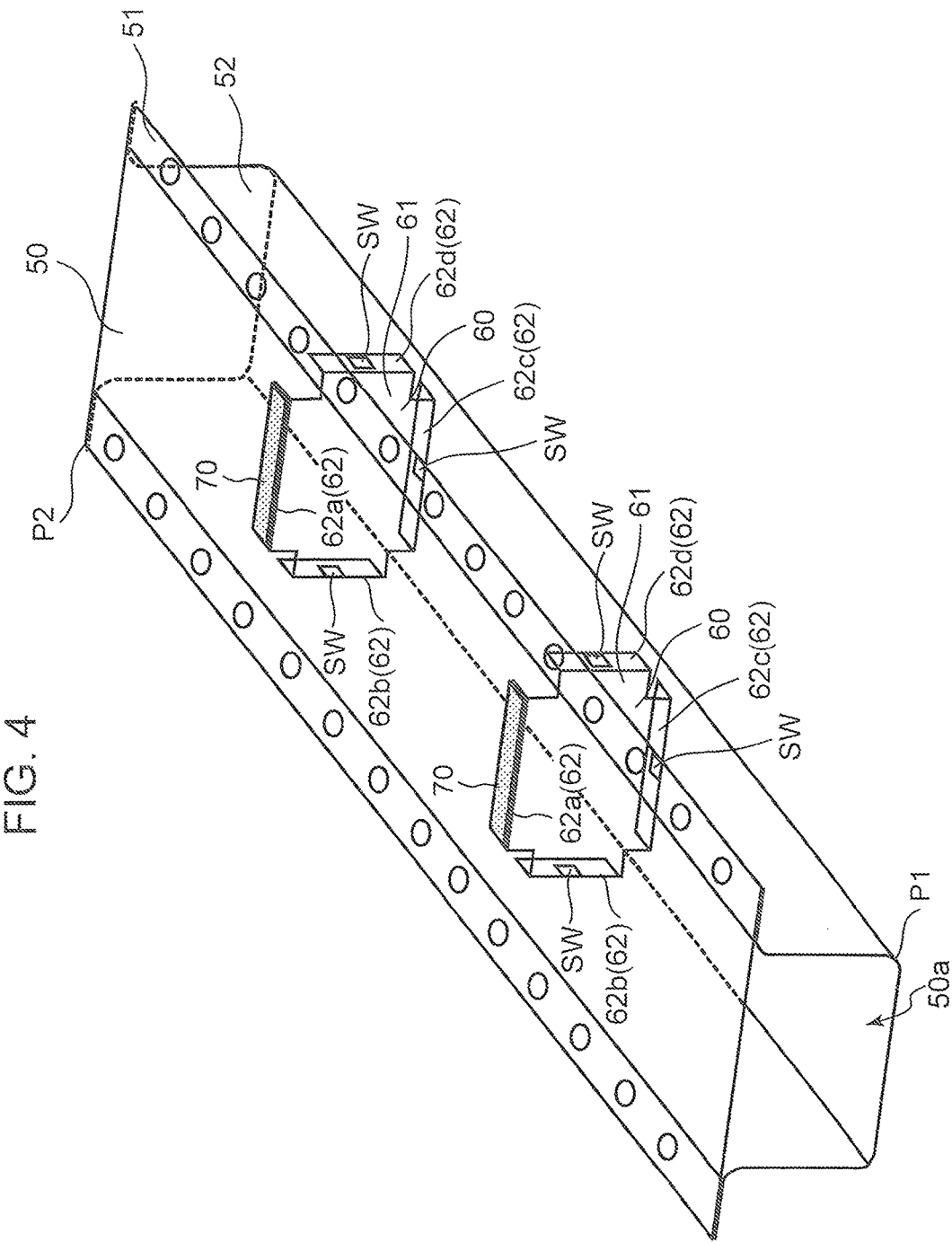
FIG. 4 is a diagram illustrating a model of a frame.

In this example, a model as illustrated in FIG. 4 was formed. Specifically, a frame 50 is constituted by a first vehicle body component 51 and a second vehicle body component 52, each of which extends in a predetermined direction. The first vehicle body component 51 has a flat plate-like shape. The second vehicle body component 52 has a hat-shape in section, and is opened toward the first vehicle body component 51. A substantially rectangular closed cross sectional portion 50a is formed inside the frame 50 by the vehicle body components 51 and 52. Further, in this example, two bulk heads 60 and 60 are disposed in the frame 50 at positions away from each other in the longitudinal direction of the vehicle body component 51 (52). Each of the bulk heads 60 is constituted by a substantially rectangular partition portion 61, and four flange portions 62 (62a to 62d), each of which projects vertically from a respective corresponding side of the partition portion 61, and extends along the inner surface of the frame 50. Further, a vibration damping member 70 is formed by coating on a surface of one (first flange portion 62a) of the flange portions, which faces the inner surface of the first vehicle body component 51. Thus, the first flange portion 62a and the first vehicle body component 51 are softly connected to each other. The flange portions 62b to 62d as the remaining flange portions, and the inner surface of the second vehicle body component 52 are connected to each other by spot-welding at a middle portion SW of each of the flange portions 62b to 62d.

Figure 5:
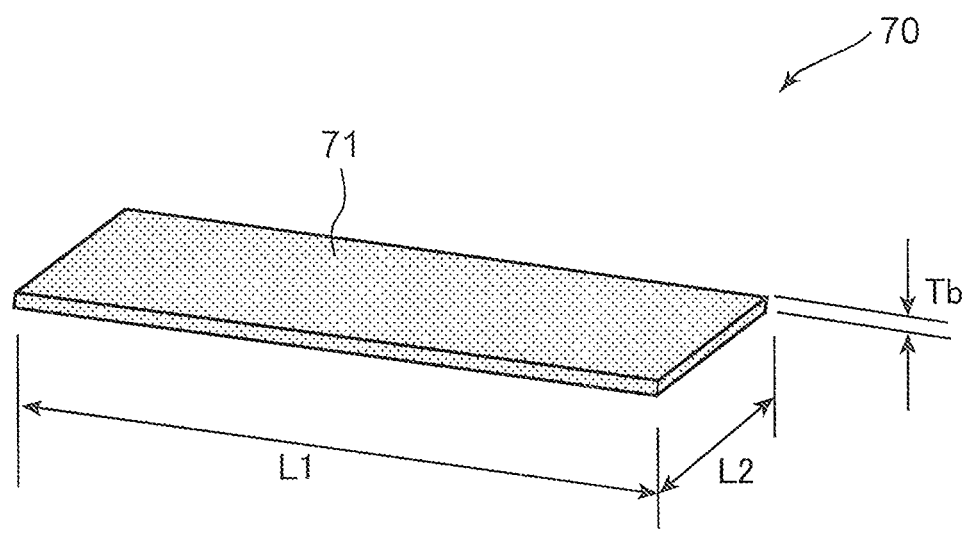
FIG. 5 is a schematic diagram of a vibration damping member.

In the model formed as described above, assuming that a predetermined corner portion of a closed cross sectional portion of the frame 50 is an excitation point P1, and a predetermined corner portion of a closed cross sectional portion of the frame 50 on the side opposite to the excitation point P1 with respect to the bulk head 60 in the longitudinal direction of the frame 50 is a response point P2, an inertance (magnitude of acceleration amplitude per unit excitation force) at the response point P2 to be obtained when vibration of a predetermined frequency was applied to the excitation point P1 was simulatively obtained by changing the physical property of the vibration damping member, the shape of the vibration damping member, and the shape of the frame. In this example, simulation was performed by applying vibration whose frequency was 30 Hz, which was similar to the vibration applied to a main skeleton of the vehicle body. Further, 20° C. was given as a temperature condition. Further, regarding the shape of the vibration damping member 70, the thickness Tb of the vibration damping member 70 (a distance between the first flange portion 62a and the first vehicle body component 51, see FIG. 5), and the longitudinal length L1 and the transverse length L2 (see FIG. 5) of a coated surface 71 of the vibration damping member 70 (a surface in contact with the first vehicle body component 50 were individually changed.

As a result of detailed analysis of the aforementioned simulation, the inventors found that when the physical property of the vibration damping member and the shape of the vibration damping member were observed in terms of a parameter i.e. a storage shear rigidity of the vibration damping member, it is possible to express a change in the vibration damping effect in terms of the storage shear rigidity, in other words, there is a high correlation between a storage shear rigidity of a vibration damping member, and a vibration damping effect. Further, the inventors found that this relationship is approximately uniform regardless of the shape of a frame.

Figure 6:
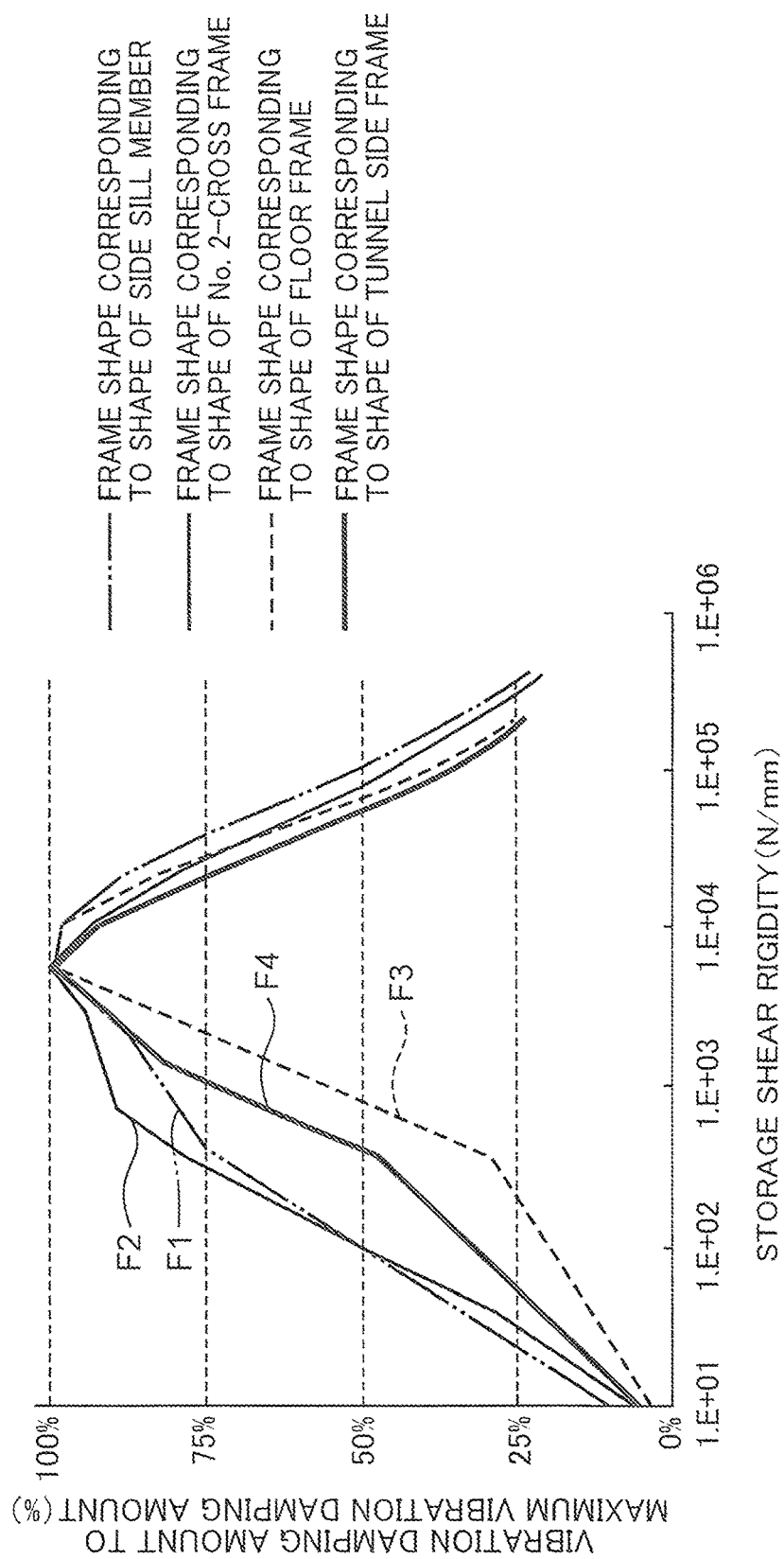
FIG. 6 is a diagram illustrating a relationship between a storage shear rigidity of a vibration damping member, and a vibration damping effect.

FIG. 6 is a graph in which the horizontal axis denotes a storage shear rigidity KB' of a vibration damping member, and the vertical axis denotes a vibration damping effect. In this example, the storage shear rigidity KB' is derived from an elastic property of a viscoelastic material, and expresses a total elastic property of the viscoelastic material including the physical property and the shape thereof. The storage shear rigidity KB' is a value expressed by (load at maximum displacement)/(maximum displacement) in a load-displacement diagram when sinusoidal deformation is applied to a viscoelastic material. The storage shear rigidity KB' changes depending on different parameters such as a storage shear rigidity modulus G' of a vibration damping member, the thickness Tb, and the longitudinal length L1 and the transverse length L2 of a coated surface of the vibration damping member. The inventors found that the storage shear rigidity KB' (N/mm) mainly varies depending on the storage shear rigidity modulus G' (MPa), the area Ab (mm$^2$, Ab=L1×L2) of a coated surface, and the thickness Tb (mm) of a vibration damping member, and that it is possible to express the storage shear rigidity KB' in a simplified manner by KB'=G'×Ab/Tb. Therefore, a value on the horizontal axis in FIG. 6 is substantially equal to a value expressed by KB'=G'×Ab/Tb.

A vibration damping effect on the vertical axis in FIG. 6 is expressed by a ratio of each vibration damping amount with respect to a maximum amount of the vibration damping amount, when it is assumed that the maximum amount of a vibration damping amount to be obtained by providing a vibration damping member is 100%. Note that the vibration damping amount is a difference between an inertance of a frame without a vibration damping member, and an inertance of a frame provided with a vibration damping member. Further, in FIG. 6, each line represents a value for each frame. Specifically, the line F1 represents a value when the frame shape is a shape corresponding to the shape of a side sill member, the line F2 represents a value when the frame shape is a shape corresponding to the shape of a No. 2-cross frame, the line F3 represents a value when the frame shape is a shape corresponding to the shape of a floor frame, and the line F4 represents a value when the frame shape is a shape corresponding to the shape of a tunnel side frame.

As illustrated in FIG. 6, a vibration damping effect has a high correlation with respect to a storage shear rigidity of a vibration damping member. Further, this relationship is approximately uniform regardless of the shape of a frame. Specifically, the vibration damping effect is maximum when the storage shear rigidity KB' of a vibration damping member is near 8000 N/mm. As the storage shear rigidity KB' is smaller or larger than the aforementioned value, the vibration damping effect decreases. This is conceivably because when the storage shear rigidity KB' is small, a vibration damping member is easily deformed as vibration increases, and the amount of absorbing vibration energy by the vibration damping member decreases. Further, when the storage shear rigidity KB' is large, it is difficult to deform a vibration damping member as vibration increases. This may lower absorption of vibration energy by the deformation.

Figure 7:
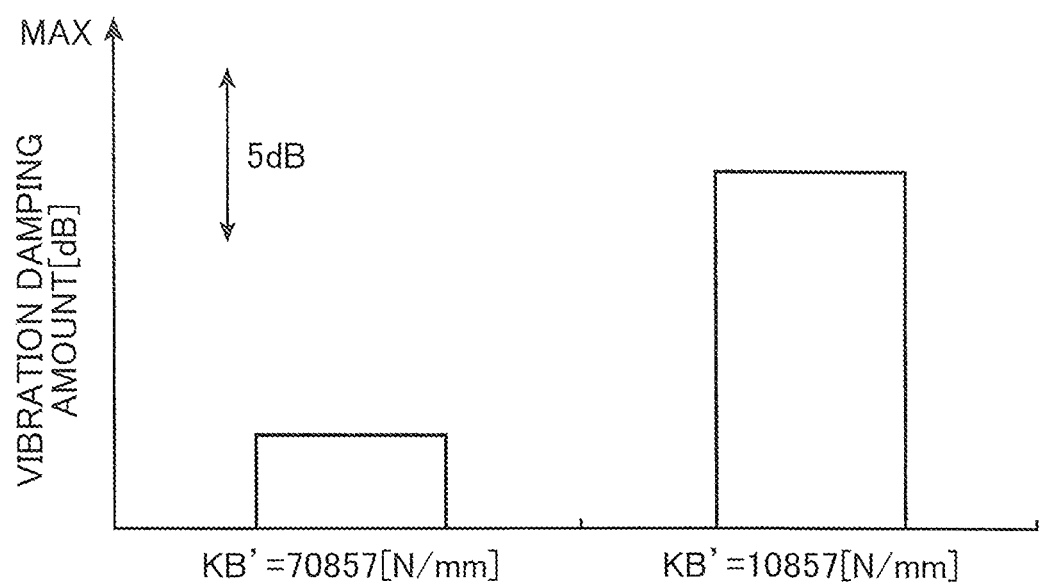
FIG. 7 is a diagram illustrating a relationship between a storage shear rigidity of a vibration damping member, and a vibration damping amount.

FIG. 7 illustrates a result of an experiment on vibration damping amounts when the storage shear rigidity KB' of a vibration damping member is 70857 N/mm, and when the storage shear rigidity KB' of a vibration damping member is 10857 N/mm. As illustrated in FIG. 7, the experiment clearly shows that when the storage shear rigidity KB' exceeds a predetermined value, a vibration damping amount decreases.

Based on the aforementioned findings, as described above, in the vehicle body structure for a vehicle according to the embodiment of the present invention, one of flange portions of a bulk head provided in a closed cross sectional portion to be formed inside a frame member, namely, in a closed cross sectional portion constituted by one or more vehicle body components is softly connected to the inner surface of the vehicle body component via a vibration damping member, and the other flange portions are connected to the inner surface by spot-welding. Further, the vehicle body structure is configured in such a manner that the storage shear rigidity KB' of the vibration damping member satisfies a requirement: 800 N/mm<KB'<57500 N/mm.

As illustrated in FIG. 6, the range of from 800 N/mm to 57500 N/mm is a range capable of securing a vibration damping effect by at least one-half (50%) or more of a maximum amount of the vibration damping effect. Therefore, the aforementioned configuration makes it possible to securely obtain a vibration damping effect. It is needless to say that it is possible to maximally obtain a vibration damping effect by setting the storage shear rigidity KB' of a vibration damping member to or around 8000 N/mm. In view of the above, it is more preferable to set the storage shear rigidity KB' to 8000 N/mm. Actually, however, in coating a material for a vibration damping member on a flange portion, the thickness Tb of the vibration damping member may vary due to a variation in coating thickness. As a result, a storage shear rigidity of the vibration damping member may vary. For instance, the thickness Tb may include a variation of about ±1.5 mm in terms of a variation in coating thickness. By setting a storage shear rigidity modulus of a vibration damping member, and an area of a coated surface to respective predetermined values, it is possible to secure the storage shear rigidity KB' in the range of 800 N/mm<KB'<57500 N/mm, even when the thickness Tb varies as described above. In this way, even when a coating thickness varies, it is possible to uniformly secure a vibration damping effect of one-half or more of a maximum amount of the vibration damping effect for different frames or for different vehicles.

Further, the inventors conducted an experiment in which plural passengers were caused to experience a vibration damping effect in a vehicle having the aforementioned structure. As a result of the experiment, substantially all the passengers could feel that vibrations were damped, as far as the vibration damping effect was 75% or more of a maximum amount of the vibration damping effect. In view of the above, it is preferable to set the storage shear rigidity KB' of a vibration damping member to a value at which a vibration damping effect is 75% or more of a maximum amount of the vibration damping effect, namely, in the range of 2200 N/mm<KB'<20000 N/mm.

In this example, as described above, it is possible to express the storage shear rigidity KB' in a simplified manner by an equation: KB'=G'×Ab/Tb. Therefore, it is possible to secure a high vibration damping effect, as far as the thickness Tb of the vibration damping member, namely, the thickness Tb in a direction from a flange portion (bulk head) toward a vehicle body component, and the area Ab of a coated surface, namely, the area Ab of a surface of the vibration damping member in contact with an inner surface of the vehicle body component satisfy the requirement: KB'=G'×Ab/Tb regarding the storage shear rigidity KB' set in the aforementioned range.

As described above, the inventors found that in a structure in which a joining portion between a reinforcing body and a vehicle body component is constituted by a hard connecting portion connected to the vehicle body component in an abutting state, and a soft connecting portion connected to the vehicle body components via a vibration damping member, there is a uniform relationship between a vibration damping effect and a storage shear rigidity of the vibration damping member, the vibration damping effect is maximum when a storage shear rigidity of the damping member is a predetermined value (specifically, approximately 8000 N/mm), and the vibration damping effect decreases, as the storage shear rigidity is smaller or larger than the predetermined value without depending on the type or the shape of the vehicle body component. Further, the inventors found that it is necessary to set the storage shear rigidity in the range of from 800 N/mm to 57500 N/mm in order to secure at least one-half or more of a maximum amount of the vibration damping effect.

An aspect of the present invention is directed to a vehicle body structure for a vehicle, which includes one or more vehicle body components constituting a closed cross sectional portion. The vehicle body structure is provided with a reinforcing body disposed in the closed cross sectional portion. The reinforcing body includes a joining portion to be joined to the vehicle body component. The joining portion includes a hard connecting portion connected to the vehicle body component in an abutting state, and a soft connecting portion connected to the vehicle body component via a vibration damping member. The vibration damping member is formed in such a manner that a storage shear rigidity KB' thereof satisfies a requirement: 800 N/mm<K'<57500 N/mm.

According to the present invention, the storage shear rigidity KB' of the damping member is set in the range: 800 N/mm<KB'<57500 N/mm. This makes it possible to secure a vibration damping effect of at least one-half or more of a maximum amount of the vibration damping effect to be obtained by providing the damping member without depending on the type or the shape of the vehicle body component. Thus, the aforementioned configuration is advantageous in securely damping vibrations of a vehicle body and in improving riding comfort.

In the present invention, preferably, the vibration damping member may be formed in such a manner that the storage shear rigidity KB' thereof satisfies a requirement: 2200 N/mm<KB'<20000 N/mm.

According to the aforementioned configuration, it is possible to damp vibrations to such a level that substantially all the passengers can feel that vibrations are damped by providing a vibration damping member. Thus, the aforementioned configuration is advantageous in securely improving riding comfort for passengers.

Further, the inventors found that it is possible to express the storage shear rigidity KB' in a simplified manner by: KB'=G'×Ab/Tb where Ab is an area of a surface of the vibration damping member in contact with the vehicle body component. Tb is a thickness of the vibration damping member in a direction orthogonal to the contact surface, and G' is a storage shear rigidity modulus of the vibration damping member.

Therefore, forming the vibration damping member in such a manner that the storage shear rigidity modulus G' of the vibration damping member satisfies the aforementioned equation where Tb is a thickness of the vibration damping member, and Ab is an area of a surface of the vibration damping member in contact with the vehicle body component is advantageous in setting the storage shear rigidity to a value capable of effectively damping vibrations, and securing enhanced riding comfort.

In the aforementioned configuration, as a specific structure of the reinforcing body, the joining portion may be formed of a plurality of flange portions, each of which includes a surface facing an inner surface of the vehicle body component. One of the flange portions may constitute the soft connecting portion, and the remaining flange portions may constitute the hard connecting portion.

According to the aforementioned configuration, it is possible to secure the rigidity of a vehicle body at the hard connecting portion, and to damp vibrations at the soft connecting portion.

The invention claimed is:

1. A vehicle body structure for a vehicle, which includes one or more vehicle body components constituting a closed cross sectional portion, the vehicle body structure comprising:
   a reinforcing body disposed in the closed cross sectional portion, wherein
   the reinforcing body includes a joining portion to be joined to the vehicle body component,
   the joining portion includes a hard connecting portion connected to the vehicle body component in an abutting state, and a soft connecting portion connected to the vehicle body component via a vibration damping member,
   the vibration damping member is formed in such a manner that a storage shear rigidity KB' thereof satisfies a requirement: 800 N/mm<KB'<57500 N/mm, and
   the storage shear rigidity KB' is function of parameters which includes
      an area of a surface of the vibration damping member in contact with the vehicle body component,
      a thickness of the vibration damping member in a direction orthogonal to the contact surface, and
      a storage shear rigidity modulus of the vibration damping member.

2. The vehicle body structure for a vehicle according to claim 1, wherein the vibration damping member is formed in such a manner that the storage shear rigidity KB' thereof satisfies a requirement: 2200 N/mm<KB'<20000 N/mm.

3. The vehicle body structure for a vehicle according to claim 2, wherein
the storage shear rigidity KB' is expressed by:

$$KB'=G'\times Ab/Tb$$

where
Ab is an area of a surface of the vibration damping member in contact with the vehicle body component,
Tb is a thickness of the vibration damping member in a direction orthogonal to the contact surface, and
G' is a storage shear rigidity modulus of the vibration damping member.

4. The vehicle body structure for a vehicle according to claim 3, wherein
the joining portion is formed of a plurality of flange portions, each of which includes a surface facing an inner surface of the vehicle body component,
one of the flange portions constitutes the soft connecting portion, and
the remaining flange portions constitute the hard connecting portion.

5. The vehicle body structure for a vehicle according to claim 1, wherein
the storage shear rigidity KB' is expressed by:

$$KB'=G'\times Ab/Tb$$

where
Ab is an area of a surface of the vibration damping member in contact with the vehicle body component,
Tb is a thickness of the vibration damping member in a direction orthogonal to the contact surface, and
G' is a storage shear rigidity modulus of the vibration damping member.

6. The vehicle body structure for a vehicle according to claim 5, wherein
the joining portion is formed of a plurality of flange portions, each of which includes a surface facing an inner surface of the vehicle body component,
one of the flange portions constitutes the soft connecting portion, and
the remaining flange portions constitute the hard connecting portion.

7. The vehicle body structure for a vehicle according to claim 2, wherein
the joining portion is formed of a plurality of flange portions, each of which includes a surface facing an inner surface of the vehicle body component,
one of the flange portions constitutes the soft connecting portion, and
the remaining flange portions constitute the hard connecting portion.

8. The vehicle body structure for a vehicle according to claim 1, wherein
the joining portion is formed of a plurality of flange portions, each of which includes a surface facing an inner surface of the vehicle body component,
one of the flange portions constitutes the soft connecting portion, and
the remaining flange portions constitute the hard connecting portion.

* * * * *